Patented Dec. 7, 1926.

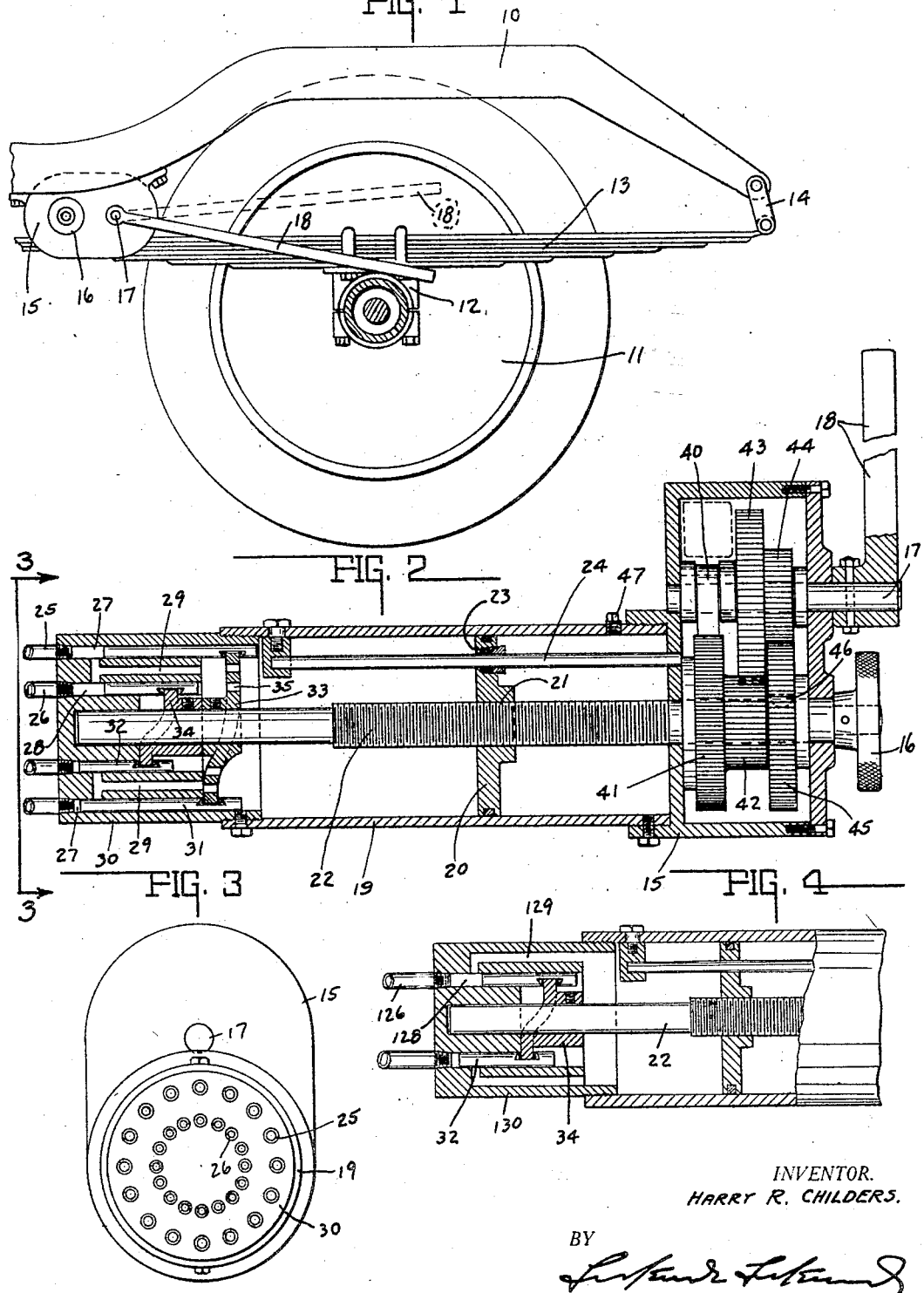

1,609,695

UNITED STATES PATENT OFFICE.

HARRY R. CHILDERS, OF INDIANAPOLIS, INDIANA, ASSIGNOR OF ONE-THIRD TO OLIVE A. DAY AND ONE-THIRD TO CECIL P. DAY, BOTH OF INDIANAPOLIS, INDIANA.

AUTOMATIC LUBRICATOR.

Application filed November 16, 1925. Serial No. 69,405.

This invention relates to an automatic lubricator device for automobiles and the like.

The chief object of this invention is to provide an automobile with a device adapted to supply lubricant under pressure to the bearings of the chassis, and by chassis is included the frame and the running gear and such other parts as may be carried thereby and require lubrication and for which automatic lubrication is not otherwise provided, such as for example, the engine.

The chief feature of the invention consists in the peculiar construction of the lubricator, whereby the same is intermittently operable and automatically operable and whereby the same also may be manually operable whenever desired, neither of the before mentioned operations interfering whatsoever with the other.

The full nature of the invention will be understood from the accompanying drawings and the following description and claims:

In the drawings Fig. 1 is a side elevational view of a portion of the vehicle chassis including the frame and running gear with which the invention is associated and upon which it is mounted. Fig. 2 is a longitudinal central sectional view through the lubricating device. Fig. 3 is an end view of the device taken on line 3—3 of Fig. 2 and in the direction of the arrows. Fig. 4 is a view similar to Fig. 2 and of a part of the device and of a modified form thereof.

In the drawings 10 indicates a frame of a chassis of a self propelled vehicle. 11 indicates the wheel supporting the same and having the axle mounting 12 carried by suitable spring means such as a leaf spring 13, suitably connected to the frame 10 and carried thereby as by the shackle 14 and other means as may be desired. Rigidly mounted upon the frame 10 is a casing 15 from which projects a hand wheel 16 and a shaft 17 upon which is mounted a lever 18. The lever 18 is positioned between the frame and axle and is adapted to be engaged by the axle in the rebound movement thereof and move from the full line position to the dotted line position. This constitutes the power applied to the lubricator and the rougher the rods the greater the lubrication required, and therefore the greater the amount of lubricant supplied to the chassis bearings.

Carried by the housings 15 is a lubricant reservoir 19 in the form of a cylinder. Slidably mounted within said reservoir is a piston 20 having a central threaded opening 21 in which is rotatably mounted a screw threaded member or shaft 22. The piston 20 is apertured as at 23 and slidably supported therein is a rod or guide 24 which extends longitudinally of the cylinder and prevents rotation of the piston with the screw threaded shaft 22. Thus rotation of shaft 22 will cause the piston 20 to advance or retire in the cylinder 19. When said piston advances it forces the lubricant ahead of it out through the several conduits 25 and 26, which conduits 25 and 26 each are associated with a port 27 and 28, respectively. The ports 27 and 28 communicate with a common supply duct 29 in open communication with the cylinder 19 said ports and ducts being carried by block or cylinder head 30. Mounted in each one of the ducts 27 and 28 is a plunger 31 and 32, respectively. The peripheral series of plungers 31 are reciprocated to and fro in the rotation of the cam 33 secured to and rotatable with the shaft 22. The plunger or pistons 31 are reciprocated to and fro in the same manner by the cam 34 similarly secured to the shaft 22. Thus as the shaft 22 is rotated the pistons 31 and 32 are reciprocated to and fro and force lubricant under pressure to the respective conduits 25 and 26 for the lubricant is supplied to ports 27 and 28 by ducts 29, which in turn are in communication with the cylinder through the medium of the ports 35 in the cam 33, and said lubricant is supplied therethrough under pressure by reason of the advance of the piston. It will be readily apparent, therefore, that rotation of shaft 22 by handle 16 which is secured thereto without the housing, causes the shaft to rotate and forces lubricant under pressure into the supply ducts 29 and out through the several connections 25 and 26 by means of the reciprocations of the respective plungers.

The means for securing the automatic rotation of shaft 22 comprises a pawl 40 pivotally mounted on the shaft 17 and eccentrically mounted thereby. Pawl 40 engages the ratchet 41 concentric with shaft 22 but loosely mounted thereon. Ratchet 41 is a continuation of the gear formed hub 42 meshing with the idler gear 43. Idler gear 43 is a continuation of pinion 44 which similarly idles and forms a gear reduction arrangement. Pinion 44 meshes with the gear 45 keyed as at 46 to the shaft 22. Thus oscillation of the lever 18 in the vibration or rebounding of the wheels with respect to the frame automatically causes the ratchet 41 to rotate in the desired direction and through the gear reduction provided rotates shaft 22 to advance the piston and reciprocate the plungers.

The plug 46 is provided for filling the cylinder when necessary.

In Fig. 4 a modified form of the invention is illustrated and in this form there is provided but a single annular series of supply ducts 126 having the supply ports 128, said ports being in communication with supply ducts 129 carried by the head 130. Plungers 32 and cam 34 are operable by shaft 22 the same as shown in Fig. 2.

The invention claimed is:

1. In a multi-stage pressure lubricator device, the combination of a rotatable shaft, a cylinder enclosing the same and including a cylinder head having intake ports communicating with the cylinder and ports discharging therefrom, a piston in said cylinder for supplying lubricant under pressure to said intake ports, a plunger associated with each port and each similarly reciprocable relatively to said shaft, and cam means carried by said shaft and rotating therewith for reciprocating said plungers.

2. A device as defined by claim 1 characterized by the ports being arranged in annular series and in a plurality of series, and a common supply duct adjacent the ports in concentric series.

3. A device as defined by claim 1 characterized by the ports being arranged in annular series and in a plurality of series, and a common supply duct adjacent the ports in concentric series, the concentric ports and ducts being radially arranged.

4. A device as defined by claim 1 characterized by the ports being arranged in annular series, and a pair of cams carried by said shaft, said ports being arranged in a pair of annular series, said coaxial cams each being associated with the plunger of each of said annular series.

In witness whereof, I have hereunto affixed my signature.

HARRY R. CHILDERS.